(12) United States Patent
    Ishida

(10) Patent No.: US 10,519,827 B2
(45) Date of Patent: Dec. 31, 2019

(54) OIL MIST FILTER AND OIL SEPARATOR

(71) Applicant: TOKYO ROKI CO., LTD., Yokohama-shi, Kanagawa (JP)

(72) Inventor: Kosaku Ishida, Yokohama (JP)

(73) Assignee: TOKYO ROKI CO., LTD., Yokohama-shi (JP)

( * ) Notice: Subject to any disclaimer, the term of this patent is extended or adjusted under 35 U.S.C. 154(b) by 141 days.

(21) Appl. No.: 15/552,632

(22) PCT Filed: Mar. 12, 2015

(86) PCT No.: PCT/JP2015/057253
§ 371 (c)(1),
(2) Date: Aug. 22, 2017

(87) PCT Pub. No.: WO2016/143107
PCT Pub. Date: Sep. 15, 2016

(65) Prior Publication Data
US 2018/0023428 A1    Jan. 25, 2018

(51) Int. Cl.
*F01M 13/04* (2006.01)
*B01D 46/00* (2006.01)
(Continued)

(52) U.S. Cl.
CPC ..... *F01M 13/0416* (2013.01); *B01D 46/0004* (2013.01); *B01D 53/0415* (2013.01);
(Continued)

(58) Field of Classification Search
None
See application file for complete search history.

(56) References Cited

U.S. PATENT DOCUMENTS 5,910,165 A * 6/1999 Haramoto .......... B01D 53/0415
                                                     210/282
6,000,383 A   12/1999 Diotte et al.
(Continued)

FOREIGN PATENT DOCUMENTS

CN       1551793 A     12/2004
CN     101903621 A     12/2010
(Continued)

OTHER PUBLICATIONS

Extended European Search Report in related application EP15884597.4, ISA/EP, Munich, dated Oct. 23, 2018.
(Continued)

*Primary Examiner* — Amber R Orlando
*Assistant Examiner* — Brit E. Anbacht
(74) *Attorney, Agent, or Firm* — Harness, Dickey & Pierce, P.L.C.

(57) ABSTRACT

An oil mist filter includes: a filter body having a tubular shape, the filter body causing processing-target gas supplied to a hollow in the filter body pass through an outer peripheral surface to capture oil mist contained in the processing-target gas; and an end plate disposed at one end surface of the filter body the end plate projecting outward beyond an outer peripheral edge of the one end surface of the filter body. A plurality of ventholes are formed at a portion of the end plate projecting beyond the outer peripheral edge of the one end surface of the filter body. The processing-target gas blown out from the outer peripheral surface of the filter body passes through the ventholes.

7 Claims, 13 Drawing Sheets

(51) Int. Cl.
B21C 23/08 (2006.01)
B01D 53/04 (2006.01)
(52) U.S. Cl.
CPC .. *B01D 2201/291* (2013.01); *B01D 2201/293* (2013.01); *B01D 2253/102* (2013.01); *B01D 2265/05* (2013.01); *B21C 23/085* (2013.01); *F01M 2013/0438* (2013.01)

(56) References Cited

U.S. PATENT DOCUMENTS

| | | | |
|---|---|---|---|
| 6,161,529 A | 12/2000 | Burgess | |
| 2007/0181487 A1* | 8/2007 | Henderson | B01D 29/21 210/424 |
| 2009/0071111 A1 | 3/2009 | Lundgren et al. | |
| 2010/0307466 A1 | 12/2010 | Ruppel et al. | |
| 2011/0023425 A1 | 2/2011 | De Paepe et al. | |
| 2014/0174296 A1* | 6/2014 | Schultz | A47L 5/365 96/226 |
| 2014/0208702 A1 | 7/2014 | Lundgren et al. | |
| 2014/0245977 A1 | 9/2014 | Krystufek et al. | |
| 2016/0136548 A1* | 5/2016 | Byun | B01D 35/005 210/435 |
| 2017/0043285 A1* | 2/2017 | Yu | B01D 35/153 |
| 2017/0106314 A1* | 4/2017 | Stamey, Jr. | B01D 29/111 |

FOREIGN PATENT DOCUMENTS

| | | |
|---|---|---|
| JP | S63(1988)-2822 U | 1/1988 |
| JP | 3613704 B2 | 1/2005 |
| JP | 4362254 B2 | 11/2009 |
| JP | 2011-506850 A | 3/2011 |
| JP | 2012-96217 A | 5/2012 |
| JP | 5602623 B2 | 8/2014 |
| JP | 2015-004330 A | 1/2015 |

OTHER PUBLICATIONS

International Search Report (in English and Japanese) of the International Searching Authority issued in PCT/JP2015/057253, dated Jun. 16, 2015, ISA/JPO.
Form PCT/IB/338 with the English Translation of the International Preliminary Report on Patentability, IB/Geneva, dated Sep. 12, 2017, incorporating the English Translation of the Written Opinion of the ISA, ISA/JP, dated Jun. 16, 2015.
Japanese Office Action in corresponding application JP 2017-504512, JPO, dated Feb. 22, 2018, with English translation thereof.
First Chinese Office Action regarding CNSN 201580077617.6, dated Jan. 14, 2019.

* cited by examiner

OIL MIST FILTER AND OIL SEPARATOR

CROSS-REFERENCE TO RELATED APPLICATIONS

This application is a 371 U.S. National Stage of International Application No. PCT/JP2015/057253, filed Mar. 12, 2015. The entire disclosure of the above application is incorporated herein by reference.

TECHNICAL FIELD

The present invention relates to an oil mist filter that captures an oil mist contained in processing-target gas and an oil separator using this oil mist filter.

BACKGROUND ART

Patent Literature 1 discloses an oil mist filter (33) and an oil separator (31) using the oil mist filter (33) (see FIG. 6). This oil mist filter (33) includes a ring-shaped support body (48) and a circular plate-shaped filter body (47). The filter body (47) is stuck on one surface of the support body (48). The filter body (47) closes a hole (49) at a center of the support body (48). A housing (32) of the oil separator (31) internally houses the support body (48) and the filter body (47). The support body (48) and the filter body (47) partition an internal space of the housing (32) into an inflow port side and an outflow port side. When blow-by gas passes through the filter body (47), the filter body (47) captures an oil mist.

CITATION LIST

Patent Literature

Patent Literature 1: Japanese Unexamined Patent Application Publication No. 2015-4330

DISCLOSURE OF THE INVENTION

Problems to be Solved by the Invention

When the blow-by gas passes through the filter body, sprays of oil scatter from the filter body. When the captured oil is accumulated at a bottom of the housing and the filter body is immersed in the oil, the blow-by gas passing through the filter body becomes air bubbles in the oil and the sprays of the oil scatter when the air bubbles blow out from a liquid surface of the oil.
This sends the scattered oil sprays to downstream of the oil separator together with the blow-by gas.

The present invention has been made in consideration of such circumstances. An object of the present invention is to avoid oil sprays to be sent to downstream.

SUMMARY OF INVENTION

An oil mist filter to solve the above-described problem includes a filter body having a tubular shape, the filter body causing processing-target gas supplied to a hollow in the filter body to pass through an outer peripheral surface to capture oil mist contained in the processing-target gas; and an end plate disposed at one end surface of the filter body, the end plate projecting outward beyond an outer peripheral edge of the one end surface of the filter body, wherein a plurality of ventholes are formed at a portion projecting beyond the outer peripheral edge of the one end surface of the filter body in the end plate, and the processing-target gas blown out from the outer peripheral surface of the filter body passes through the ventholes.

Further, an oil separator includes: the oil mist filter; and a housing that houses the oil mist filter, wherein the housing includes: a box-shaped case having an opening; and a box-shaped cover having an opening, an internal space of the housing is formed by facing the opening of the case and the opening of the cover and by butting together an edge portion on the opening of the case and an edge portion on the opening of the cover while a peripheral edge portion of the end plate is interposed between the case and the cover, the internal space of the housing is partitioned by the end plate into two regions, and the filter body is housed in one region of the two regions.

Suppose that oil captured by the filter body blows out from the outer peripheral surface of the filter body when the processing-target gas sent inside the filter body passes through the outer peripheral surface of the filter body. In this case, the oil is caught at the portion of the end plate projecting outward beyond the outer peripheral edge of the one end surface of the filter body; therefore, the oil does not pass through the ventholes. Accordingly, the processing-target gas flowing from the ventholes to downstream hardly contains the oil. Therefore, oil separation efficiency brought by the oil separator is high.

In the above-described oil mist filter, the portion of the end plate projecting beyond the outer peripheral edge of the one end surface of the filter body inclines to another end surface of the filter body.

Therefore, the space can be ensured on a side closer to the one end surface of the filter with respect to the portion of the end plate projecting beyond the outer peripheral edge of the one end surface of the filter body.

The above-described oil mist filter further includes a gasket disposed at a peripheral edge portion of the end plate.

This allows replacing the gasket together when the end plate and the filter body are replaced, thereby facilitating the replacement work of the oil mist filter.

The oil mist filter further includes a second end plate disposed at the other end surface of the filter body. And, the second end plate has a gas introduction hole, and the gas introduction hole is communicated with the hollow in the filter body.

This allows preventing the processing-target gas and the oil from blowing out from the other end surface of the filter.

The above-described oil mist filter further includes a grid-like frame disposed along an inner peripheral surface of the filter body.

Therefore, the frame supports the filter body, thereby ensuring preventing a shape of the filter body from breaking and a similar failure.

The above-described oil separator further includes: a gas-introduction flow passage disposed in the housing, the gas-introduction flow passage introducing the processing-target gas containing the oil mist from outside the housing to the hollow in the filter body; a bypass flow passage disposed in the housing, the bypass flow passage being branched from the gas-introduction flow passage and extending in the one region to outside the outer peripheral surface of the filter body; a relief valve disposed at the bypass flow passage, the relief valve being to close the bypass flow passage when a pressure of the processing-target gas introduced to the gas-introduction flow passage is less than a predetermined threshold, the relief valve being to open the bypass flow passage when the pressure of the processing-target gas introduced to the gas-introduction flow passage is equal to or more than the predetermined threshold; and a gas discharge portion disposed in the other region of the two regions in the housing, the gas discharge portion discharging the processing-target gas from the other region.

Therefore, for example, even if the filter body is clogged, the processing-target gas passes through the bypass flow passage and flows to the gas discharge portion. Accordingly, a failure such as a stop of the flow of the processing-target gas can be prevented.

The above-described oil separator further includes an oil drain flow passage disposed in the housing, the oil drain flow passage being branched from the gas-introduction flow passage and extending to the one region; and an anti-drain valve disposed at the oil drain flow passage, the anti-drain valve being to close the oil drain flow passage by the pressure of the processing-target gas introduced to the gas-introduction flow passage, the anti-drain valve being to open the oil drain flow passage when the processing-target gas is not introduced to the gas-introduction flow passage.

Therefore, in the case where the processing-target gas is sent to the gas-introduction flow passage, the anti-drain valve closes the oil drain flow passage to avoid the oil inside the housing to flow into the gas-introduction flow passage. This allows preventing the processing-target gas flowing inside the filter body through the gas-introduction flow passage from contacting the oil inside the gas-introduction flow passage. Accordingly, oil separation efficiency brought by this oil separator is high.

Advantageous Effects of Invention

With the present invention, even if oil blows out from an outer peripheral surface of a filter body, the oil is caught at a portion projecting outward beyond an outer peripheral edge of one end surface of the filter body in an end plate. Accordingly, the processing-target gas flowing from vent-holes to downstream hardly contains the oil.

DETAILED DESCRIPTION

Figure 1:
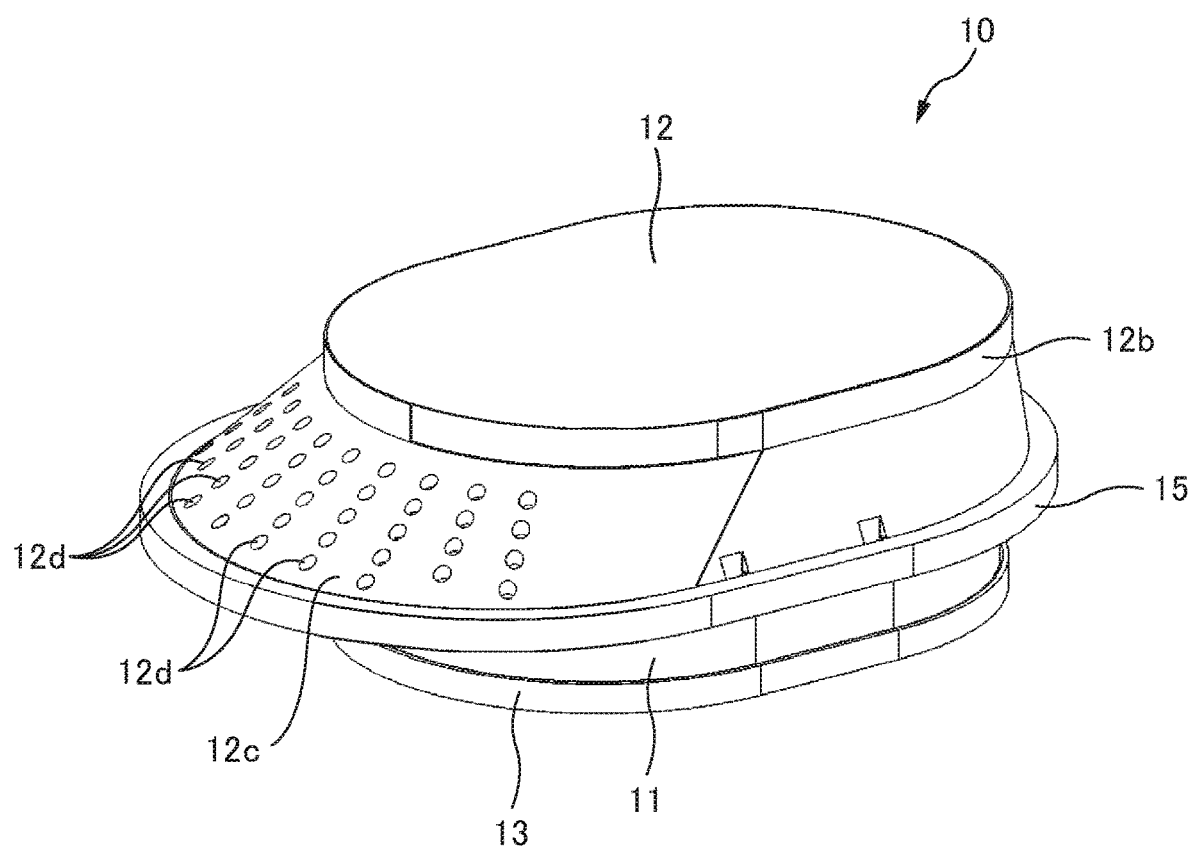
FIG. 1 is a perspective view illustrating a mist capturing device viewed from a rear side, a right side, and an upper side.
Figure 2:
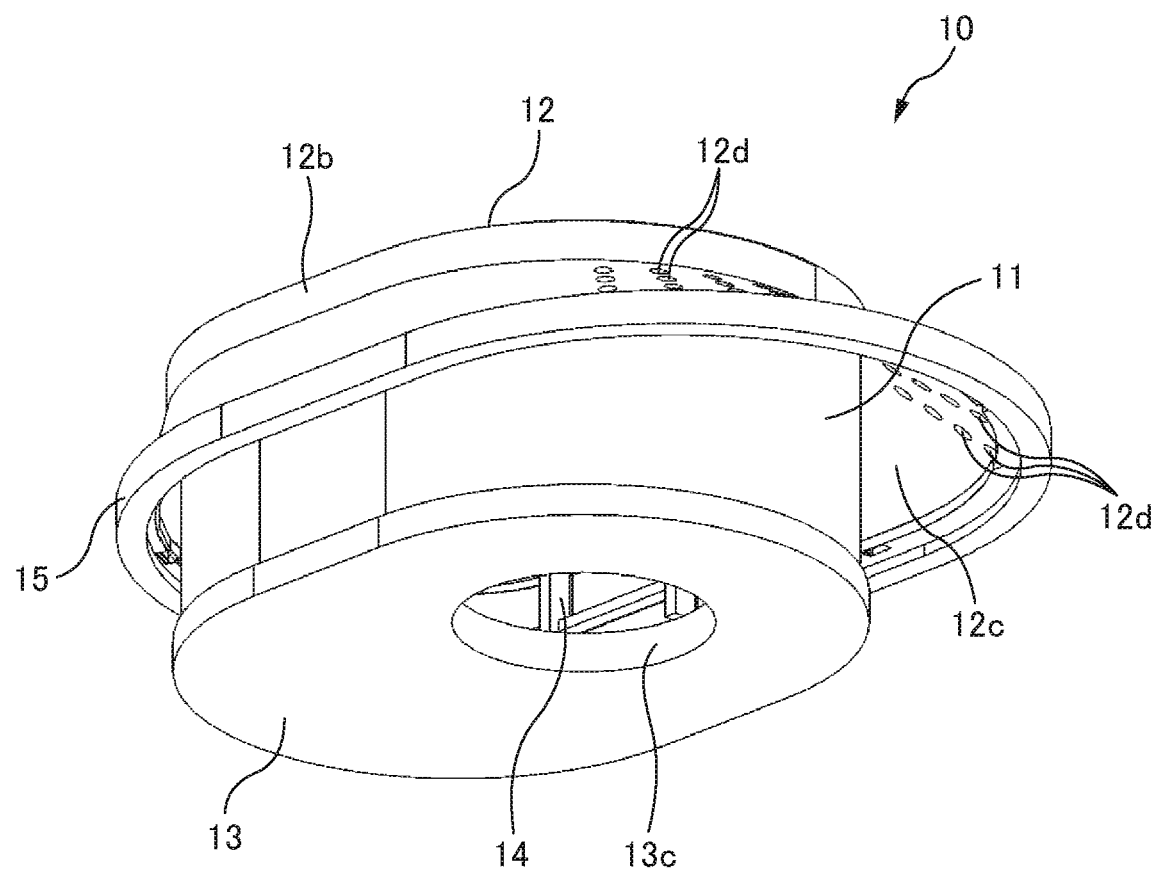
FIG. 2 is a perspective view illustrating the mist capturing device viewed from a front side, the right side, and a lower side.
Figure 3:
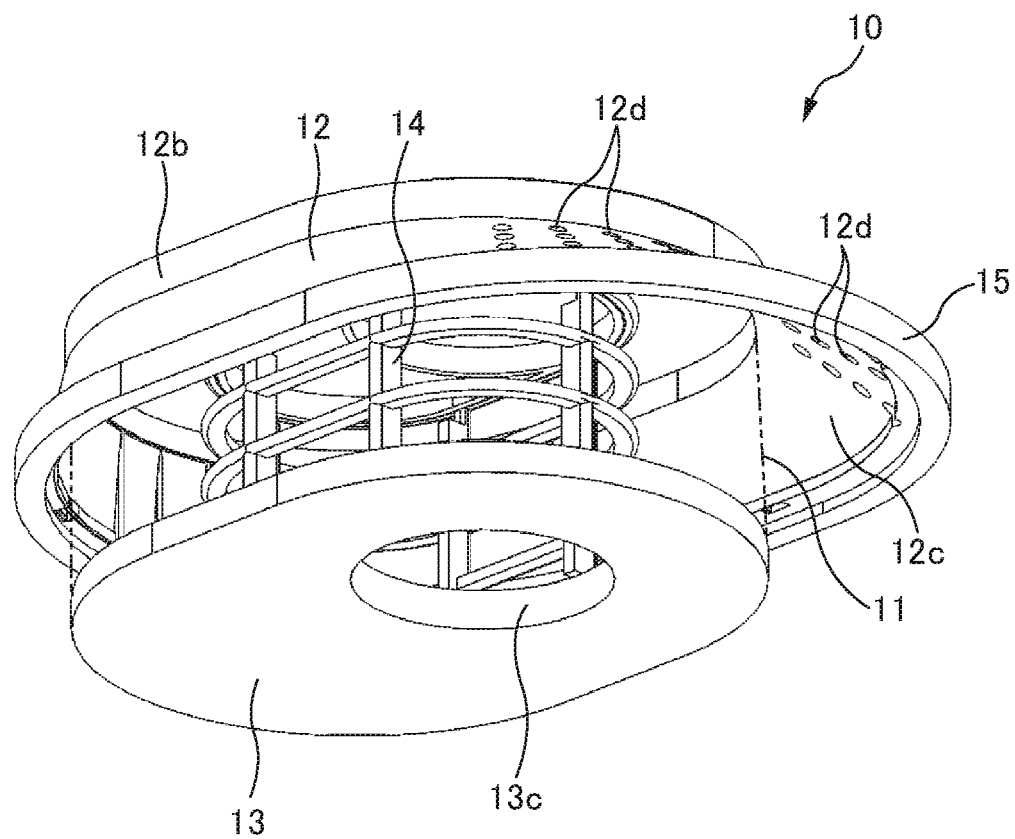
FIG. 3 is a perspective view illustrating the mist capturing device from the front side, the right side, and the lower side.
Figure 4:
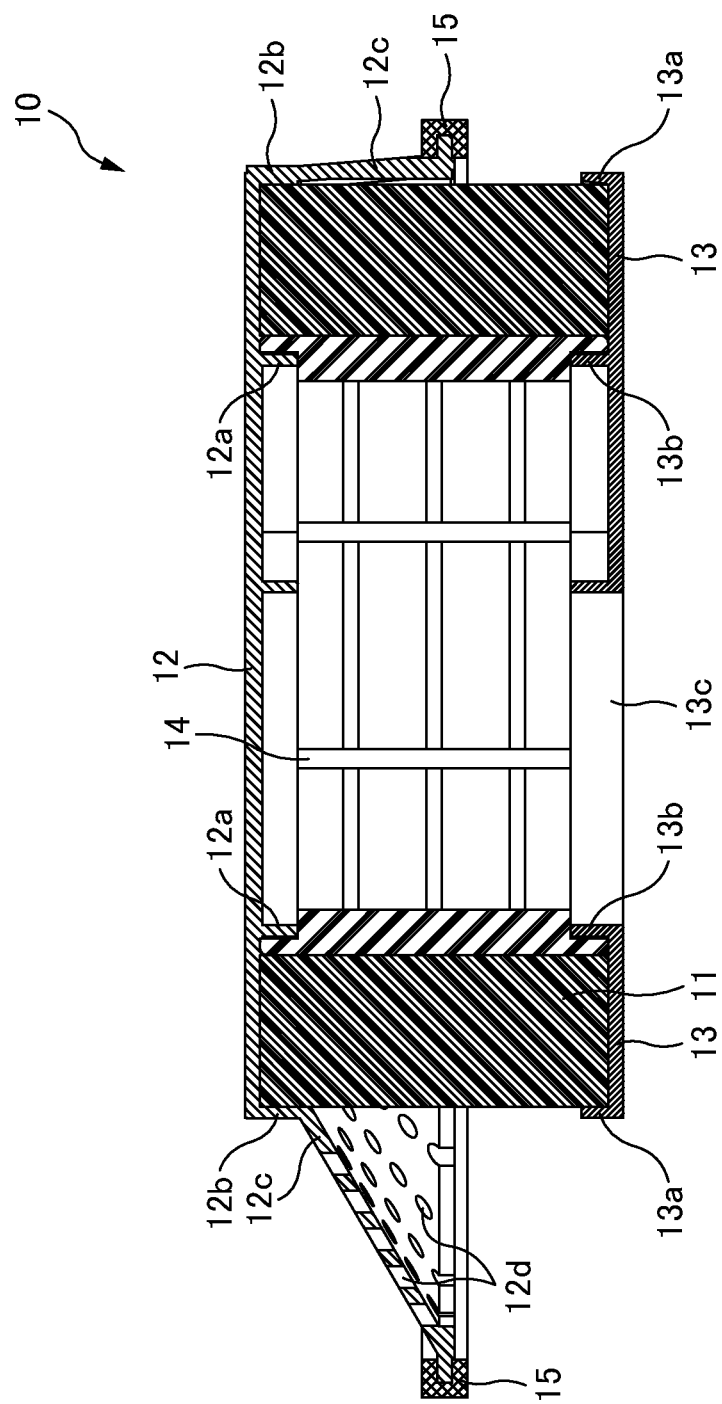
FIG. 4 is a cross-sectional view illustrating a vertical cross-sectional surface of the mist capturing device viewed from the rear side.

The following describes embodiments of the present invention with reference to the drawings. The embodiments described below include various limitations technically preferable to embody the present invention; therefore, the scope of the present invention is not limited to the following embodiments and the examples illustrated in the drawings.

First Embodiment

An oil mist filter 10 illustrated in FIGS. 1 to 4 is a filter element used by an oil separator (a mist eliminator). In the case of deterioration or a similar failure of the oil mist filter 10, the oil mist filter 10, which is mounted to the housing of the oil separator, is replaced by a new oil mist filter 10. Therefore, the oil mist filter 10 is consumables.

The oil mist filter 10 includes a filter body 11, a first end plate 12, a second end plate 13, a frame (a frame member) 14, a gasket 15, and a similar component. This oil mist filter 10 is an assembly (an assembled product). That is, the filter body 11, the first end plate 12, the second endplate 13, the frame 14, and the gasket 15 are assembled, and a collection of these components 11 to 15 is the oil mist filter 10.

The appearance of the filter body 11 is in a hollow-column shape (more specifically, a cylinder whose cross section is an oblong circle) and the center part of the filter body 11 is formed as a space. The internal space is open at the upper end and the lower end of the filter body 11. The filter body 11 is made of porous material and more specifically non-woven fabric.

The filter body 11 internally houses the grid-like frame 14. This frame 14 is disposed along the inner peripheral surface of the filter body 11. The filter body 11 is supported by the frame 14 from the inside.

The first end plate 12 is coupled to the upper end of the frame 14, and the second end plate 13 is coupled to the lower end of the frame 14. The frame 14 ensures a space between the first end plate 12 and the second end plate 13. The filter body 11 is interposed between the first end plate 12 and the second end plate 13.

An outer peripheral rib 13a is disposed projecting upward at the outer peripheral edge of the top surface of the second end plate 13. An inner peripheral rib 13b is disposed projecting upward on the top surface of the second end plate 13 and inside the outer peripheral rib 13a. Therefore, a depressed portion is formed between these outer peripheral rib 13a and inner peripheral rib 13b.

The lower end portion of the filter body 11 is fitted between the outer peripheral rib 13a and the inner peripheral rib 13b. The lower end surface of the filter body 11 abuts on the top surface of the second end plate 13. The lower end surface of the filter body 11 may be bonded to the top surface of the second end plate 13 with tackiness agent, adhesive or the like.

The frame 14 is disposed along the inner peripheral rib 13b, and the lower end portion of the frame 14 engages with the inner peripheral rib 13b. The inner peripheral rib 13b is inserted into the lower opening of the filter body 11. The lower end portion of the frame 14 is interposed between the inner peripheral rib 13b and the outer peripheral surface of the filter body 11.

A gas introduction hole 13c is formed in a part of the second end plate 13 inside with respect to the inner peripheral rib 13b so as to vertically penetrate the second end plate 13. The gas introduction hole 13c causes the internal space of the filter body 11 to communicate with a space lower than the second end plate 13.

An ellipse-shaped rib 12a is disposed projecting downward at the center part of the lower surface of the first end plate 12. The position of the rib 12a is inside with respect to the outer peripheral edge of the first end plate 12. The first end plate 12 is bent downward at a position outside with respect to the rib 12a, and a stepped portion 12b with a frame shape viewed from below is formed at the position. Therefore, a depressed portion is formed between the stepped portion 12b and the rib 12a. The upper end portion of the filter body 11 is fitted to the depressed portion. In the depressed portion between the stepped portion 12b and the rib 12a, a top end surface of the filter body 11 abuts on the lower surface of the first end plate 12. The top end surface of the filter body 11 may be bonded to the lower surface of the first end plate 12 with tackiness agent, adhesive or the like.

The frame 14 is disposed along the rib 12a, and the upper end portion of the frame 14 engages with the rib 12a. Further, the rib 12a is inserted into the upper opening of the filter body 11. The upper end portion of the frame 14 is interposed between the rib 12a and the outer peripheral surface of the filter body 11.

The size of the first end plate 12 is larger than the size of the top end surface of the filter body 11. The outer peripheral portion 12c (a portion outside with respect to the stepped portion 12b) of the first end plate 12 projects outward from the outer peripheral edge of the top end surface of the filter body 11. The following refers to the outer peripheral portion 12c of the first end plate 12, that is, the portion projecting beyond the outer peripheral edge of the top end surface of the filter body 11 as the collar portion 12c.

The collar portion 12c is disposed extends outward from the lower end portion of the stepped portion 12b. The collar portion 12c inclines with respect to the top end surface of the filter body 11 from the top end surface side of the filter body 11 to the lower end surface side. That is, the collar portion 12c inclines downward and outward. The inclination angle of the collar portion 12c with respect to the top end surface of the filter body 11 is not uniform. Specifically, the slope of the collar portion 12c increases as the collar portion 12c goes in the major-axis direction from one end to the other end of the filter body 11 along the outer periphery of the filter body 11.

A plurality of ventholes 12d are formed on the collar portion 12c. These ventholes 12d vertically penetrate the collar portion 12c. A region where these ventholes 12d are distributed is a region with comparatively gentle slope in the collar portion 12c. The opening area of the ventholes 12d is smaller than the opening area of the gas introduction hole 13c on the second end plate 13.

The ring-shaped gasket 15 is mounted to the peripheral edge portion of the collar portion 12c. Specifically, a mounting depressed portion is formed circumferentially on the inner peripheral surface of the gasket 15. Thus, a cross-sectional shape of the gasket 15 becomes into a lateral U shape, and the peripheral edge portion of the collar portion 12c is fitted to the mounting depressed portion. Since the gasket 15 is attached to the first end plate 12, the gasket 15 can be mounted and removed together with the first end plate 12. This facilitates replacement and mounting work of the oil mist filter 10.

The oil mist filter 10 configured as described above is incorporated into the housing of the oil separator, and the peripheral edge portion of the collar portion 12c and the gasket 15 are vertically interposed between a case and a similar component or the like. The first end plate 12 vertically partitions a space into the upper space and the lower space.

Processing-target gas containing oil mist (for example, blow-by gas) passes through the gas introduction hole 13c from below the second end plate 13 and flows into the filter body 11. When the processing-target gas passes through from the inner peripheral surface to the outer peripheral surface of the filter body 11, the filter body 11 captures the oil mist. This separates the oil mist from the processing-target gas. The processing-target gas blown out from the outer peripheral surface of the filter body 11 passes through the ventholes 12d, and flows above the first end plate 12.

Spray of the oil captured by the filter body 11 possibly scatter from, for example, the outer peripheral surface of the filter body 11. If the lower portion of the filter body 11 is immersed in the oil, the processing-target gas blown out from the filter body 11 becomes air bubbles in the oil. The spray of the oil possibly occur when the air bubbles blow out from a liquid surface of the oil. Even in such a case, the collar portion 12c of the first end plate 12 catches the spray of the oil, preventing the spray of the oil from passing through the ventholes 12d. This features a high mist capture efficiency of the oil mist filter 10.

Since the center part of the first end plate 12 is bonded to the top end surface of the filter body 11, the processing-target gas and the oil do not blow out from the top end surface of the filter body 11. The same applies to the lower end surface of the filter body 11.

In the above-described embodiment, the gas introduction hole 13c is formed on the second end plate 13. On the other hand, the gas introduction hole may be formed on the center part of the first end plate 12. The gas introduction holes may be formed on both end plates 12 and 13 respectively.

Second Embodiment

With reference to FIGS. 5 to 12, the following describes an oil separator 3 using the above-described oil mist filter 10 and also describes an overhead ventilation system 1 using the oil separator.

Figure 5:
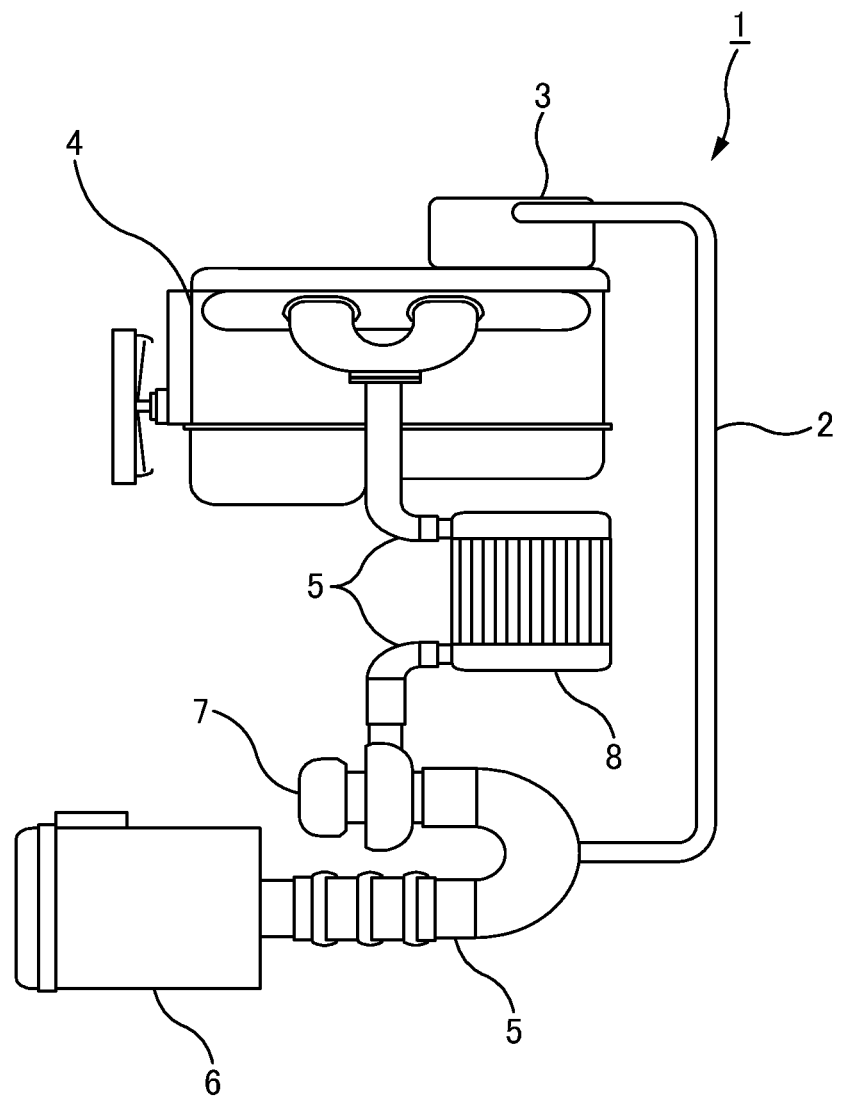
FIG. 5 is a schematic diagram illustrating a ventilation system.

The overhead ventilation system 1 illustrated in FIG. 5 includes a breather pipe 2, the oil separator 3, and a similar component. The oil separator 3 is installed in horizontal orientation and mounted to a top surface of an engine 4. The oil separator 3 and the engine 4 are coupled through the breather pipe 2 and an intake-side flow passage 5.

Blow-by gas in the engine 4 (oil mist-containing gas) flows into the oil separator 3. The oil separator 3 separates and recovers the oil mist in the blow-by gas. The blow-by gas after the separation of the oil mist is discharged from the oil separator 3, and is sent to the intake-side flow passage 5 through the breather pipe 2. Fresh air sent from an air filter 6 to the intake-side flow passage 5 is mixed with the blow-by gas, and a turbocharger 7 compresses the mixed gas. Afterwards, a charge cooler 8 cools the mixed gas compressed by the turbocharger 7, and the cooled mixed gas is supplied to the engine 4. This restores the blow-by gas from which the oil has been removed to the engine 4.

While the engine 4 operates, the oil separator 3 internally accumulates the oil recovered by the oil separator 3. Meanwhile, when the engine 4 stops, the oil recovered by the oil separator 3 is returned to the engine 4.

As illustrated in FIGS. 6 to 9, the oil separator 3 includes the oil mist filter 10, a case 20, a cover 30, a PCV valve 40, a PCV cover 50, a valve case member 60, a relief valve 70, an anti-drain valve 80, and a similar component.

This case 20 is constituted of a box-shaped member with an open top surface. The cover 30 is constituted of a box-shaped member with an open lower surface. By facing the upper opening of the case 20 and the lower opening of the cover 30, the edge portion of the upper opening of the case 20 (the top end surface of the case 20) is butted together with the edge portion of the lower opening of the cover 30 (the lower end surface of the cover 30). Engaging the cover 30 with the case 20 assembles a housing 90. An internal space is formed inside the housing 90.

A cylindrical-shaped gas discharge portion 33 is disposed projecting laterally on a side surface of the cover 30. This gas discharge portion 33 is coupled to the breather pipe 2. The processed blow-by gas from which the oil mist has been removed passes through the gas discharge portion 33 from inside the cover 30, and is discharged to the breather pipe 2.

Figure 10:
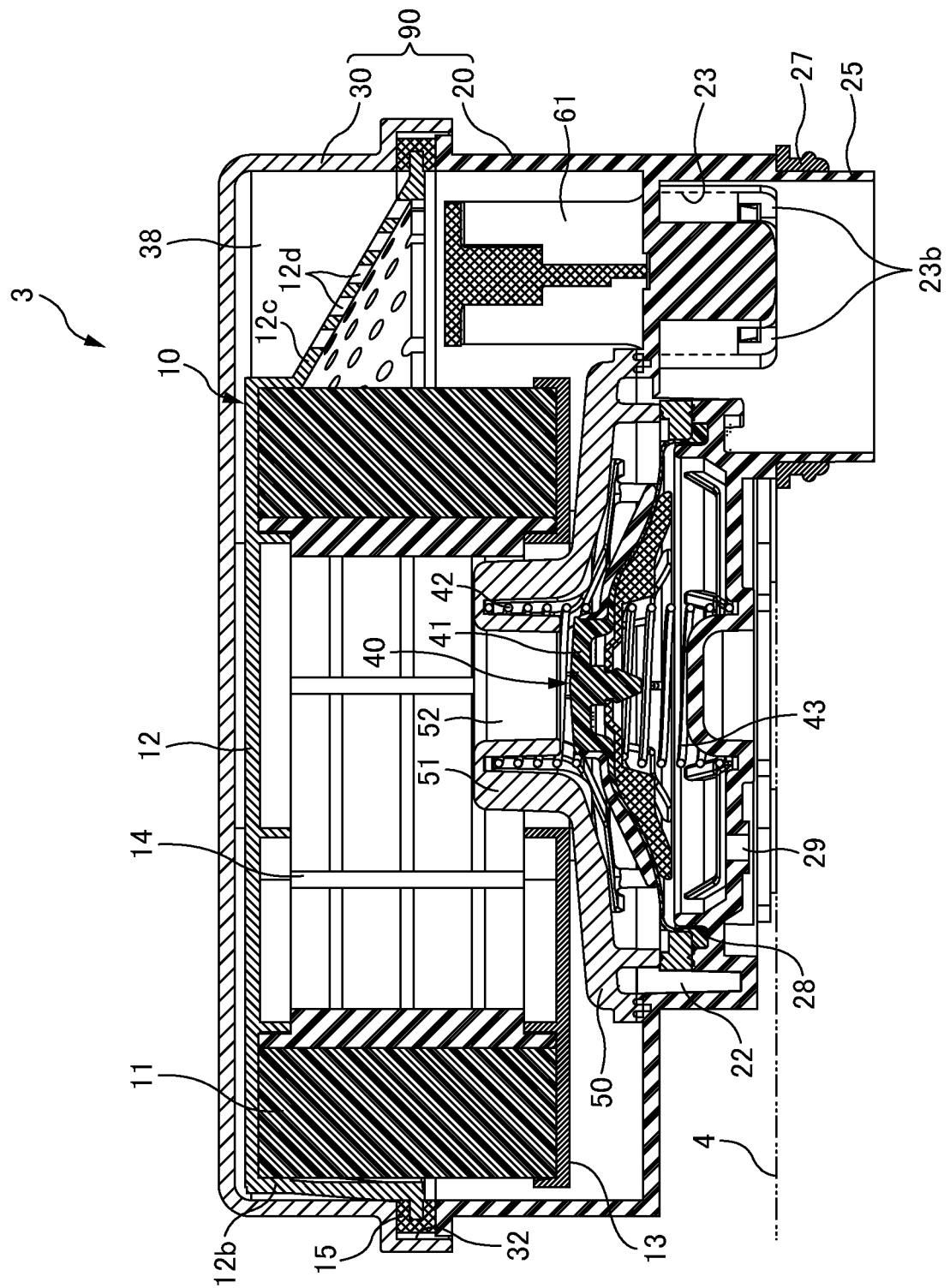
FIG. 10 is a cross-sectional view illustrating a surface taken along X-X illustrated in FIG. 8 viewed in an arrow direction.
Figure 11:
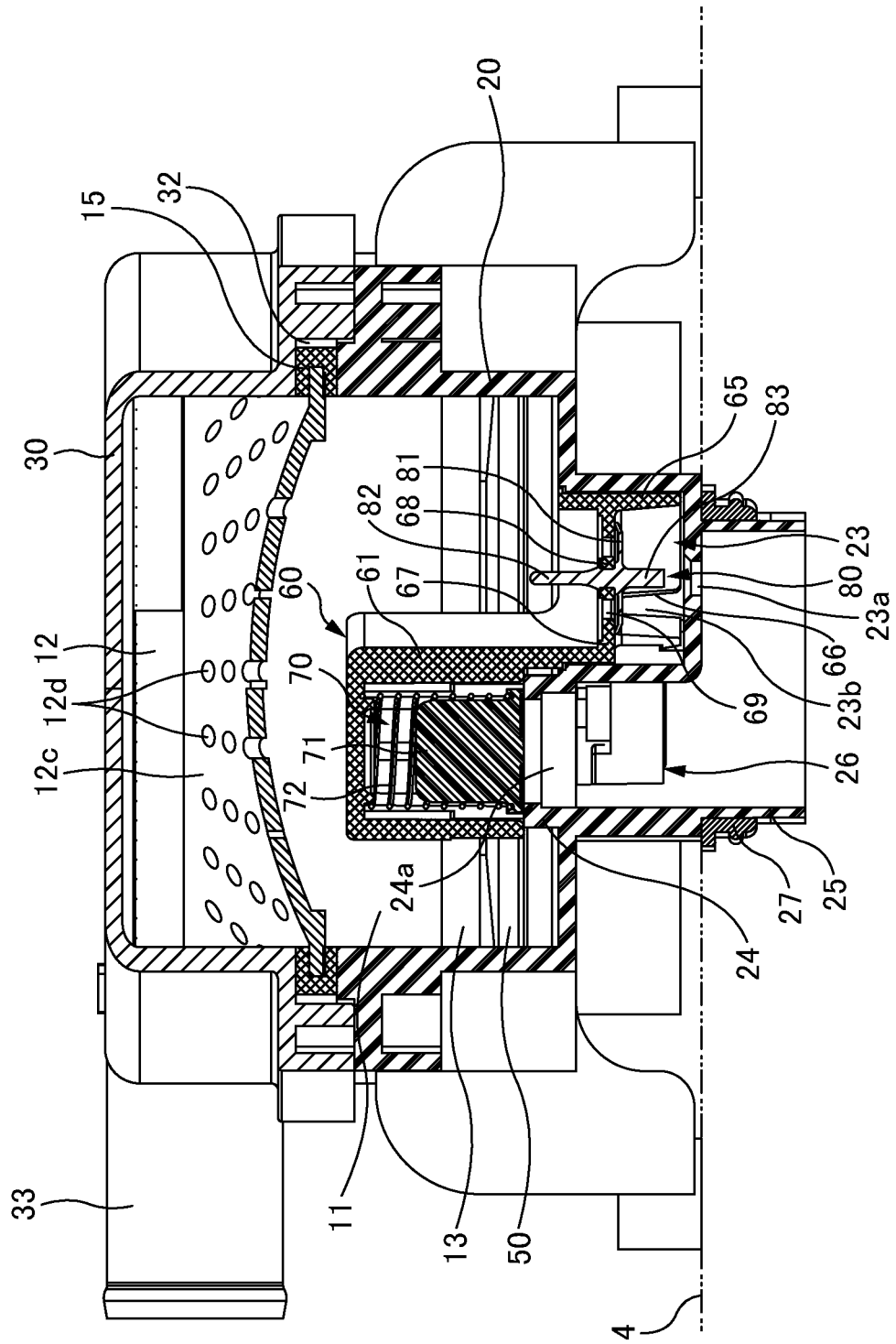
FIG. 11 is a cross-sectional view illustrating a surface taken along XI-XI illustrated in FIG. 9 viewed in an arrow direction.

As illustrated in FIGS. 10 and 11, a ring-shaped stepped depressed portion 32 is formed at the peripheral edge of the lower opening of the cover 30. The cover 30 covers the first end plate 12 of the oil mist filter 10. The peripheral edge portion of the collar portion 12c of the first end plate 12 and the gasket 15 are fitted to the stepped depressed portion 32. The upper end of the case 20 is also fitted to the stepped depressed portion 32 from below the gasket 15. The peripheral edge portion of the collar portion 12c and the gasket 15 are sandwiched between the surface of the step of the stepped depressed portion 32 and the top end surface of the case 20. Thus, the oil mist filter 10 is mounted to the case 20 and the cover 30. In addition, the filter body 11, the first end plate 12, the second end plate 13, and the frame 14 of the oil mist filter 10 are housed in the internal space between the case 20 and the cover 30.

With the oil mist filter 10 mounted to the case 20 and the cover 30, the gas discharge portion 33 is positioned higher with respect to a peripheral edge portion of the first end plate 12. The collar portion 12c of the first end plate 12 inclines to the lower end surface of the filter body 11. Accordingly, even if the center part of the first end plate 12 is disposed near the top panel of the cover 30, a space 38 is formed above the collar portion 12c (see FIG. 10). Especially, above the region of the collar portion 12c in which the plurality of ventholes 12d are formed, the space 38 becomes larger than the other regions.

Figure 6:
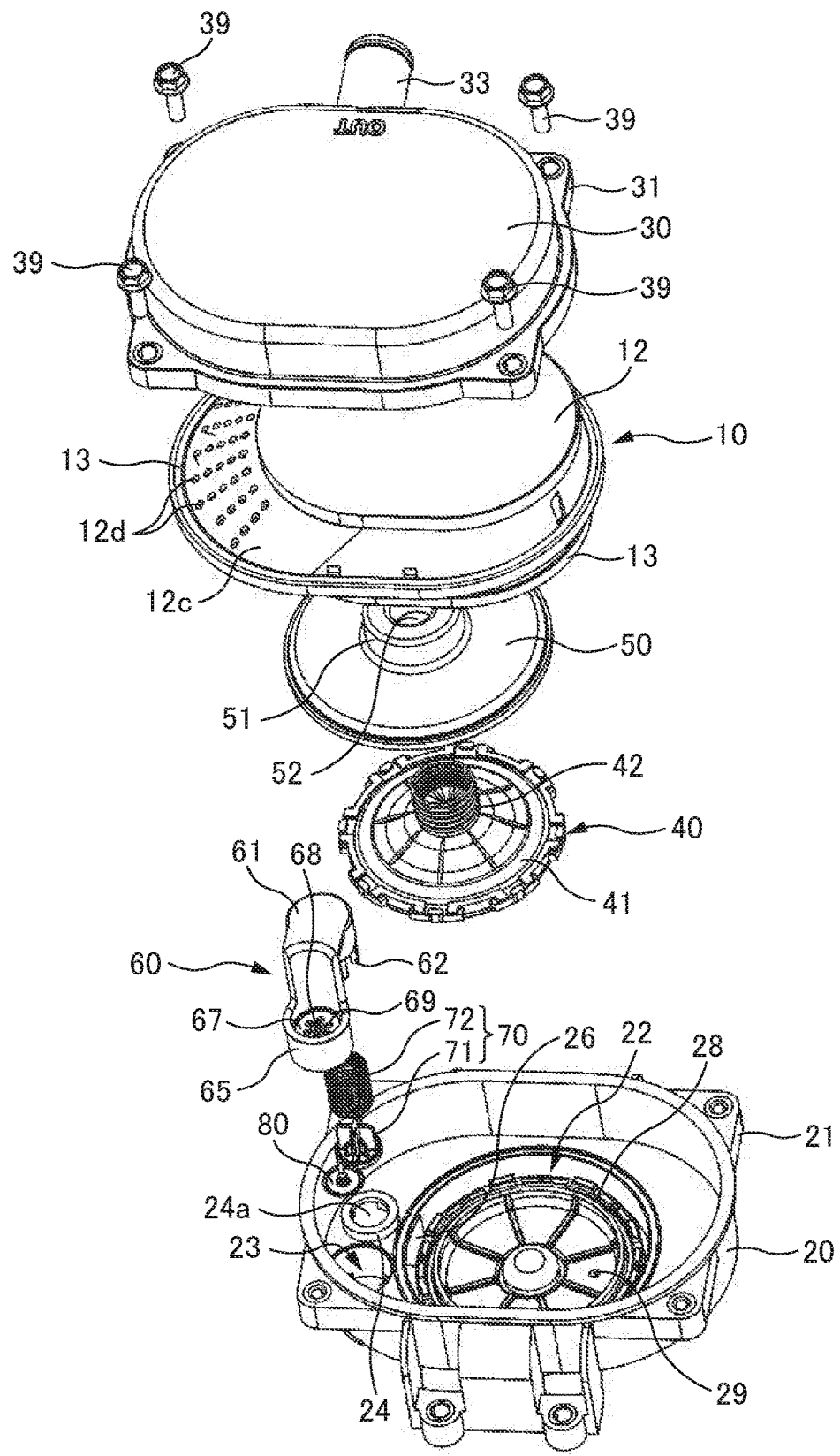
FIG. 6 is an exploded perspective view illustrating an oil separator viewed from a rear side, an upper side, and a left side.
Figure 8:
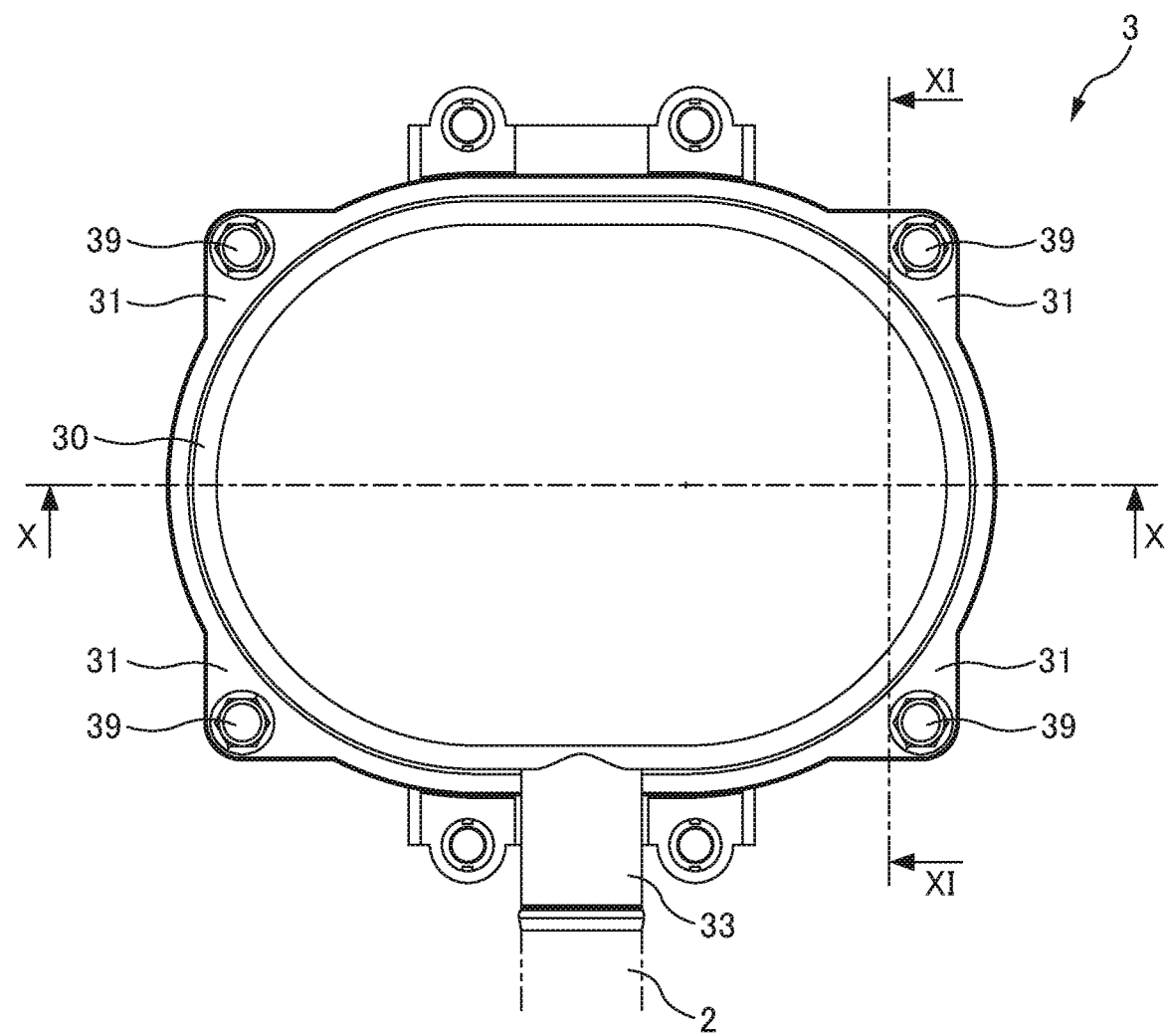
FIG. 8 is a top view of the oil separator.

As illustrated in FIGS. 6 and 8, the case 20 and the cover 30 are fixed with bolts 39. Specifically, extended edges 21 are disposed at positions slightly lower than the upper end of the outer peripheral surface of the case 20, and extended edges 31 are disposed at the lower end portion of the outer peripheral surface of the cover 30. These extended edges 21 and extended edges 31 are butted together, and these extended edges 21 and 31 are mutually tightened with the bolts 39. Loosening the tightened bolts 39 ensures separating the case 20 from the cover 30.

As illustrated in FIGS. 6, 10, and 11, a first housing depressed portion 22 and a second housing depressed portion 23 are formed at the inside bottom surface of the case 20. The first housing depressed portion 22 is positioned at an approximately center on the inside bottom surface of the case 20, and the second housing depressed portion 23 is disposed close to the first housing depressed portion 22. A ring-shaped valve seat 24 is disposed projecting at the inside bottom surface of the case 20. This valve seat 24 is disposed close to the first housing depressed portion 22 and the second housing depressed portion 23. The second housing depressed portion 23 and the valve seat 24 are arranged below the region of the collar portion 12c in which the ventholes 12d are formed.

A coupling pipe portion 25 is disposed projecting downward at the lower surface of the case 20. The coupling pipe portion 25 is arranged immediately below the second housing depressed portion 23 and the valve seat 24. The second housing depressed portion 23 and the valve seat 24 is placed above the coupling pipe portion 25 as viewed from above or below. The diameter of the coupling pipe portion 25 is larger than the diameter of the valve seat 24 and the diameter of the second housing depressed portion 23. The first housing depressed portion 22 partially overlaps the coupling pipe portion 25 as viewed from above or below.

This coupling pipe portion 25 is coupled to the top surface of the engine 4. A ring-shaped seal 27 is disposed on the outer peripheral surface of the coupling pipe portion 25, thereby to maintain air tightness.

Figure 7:
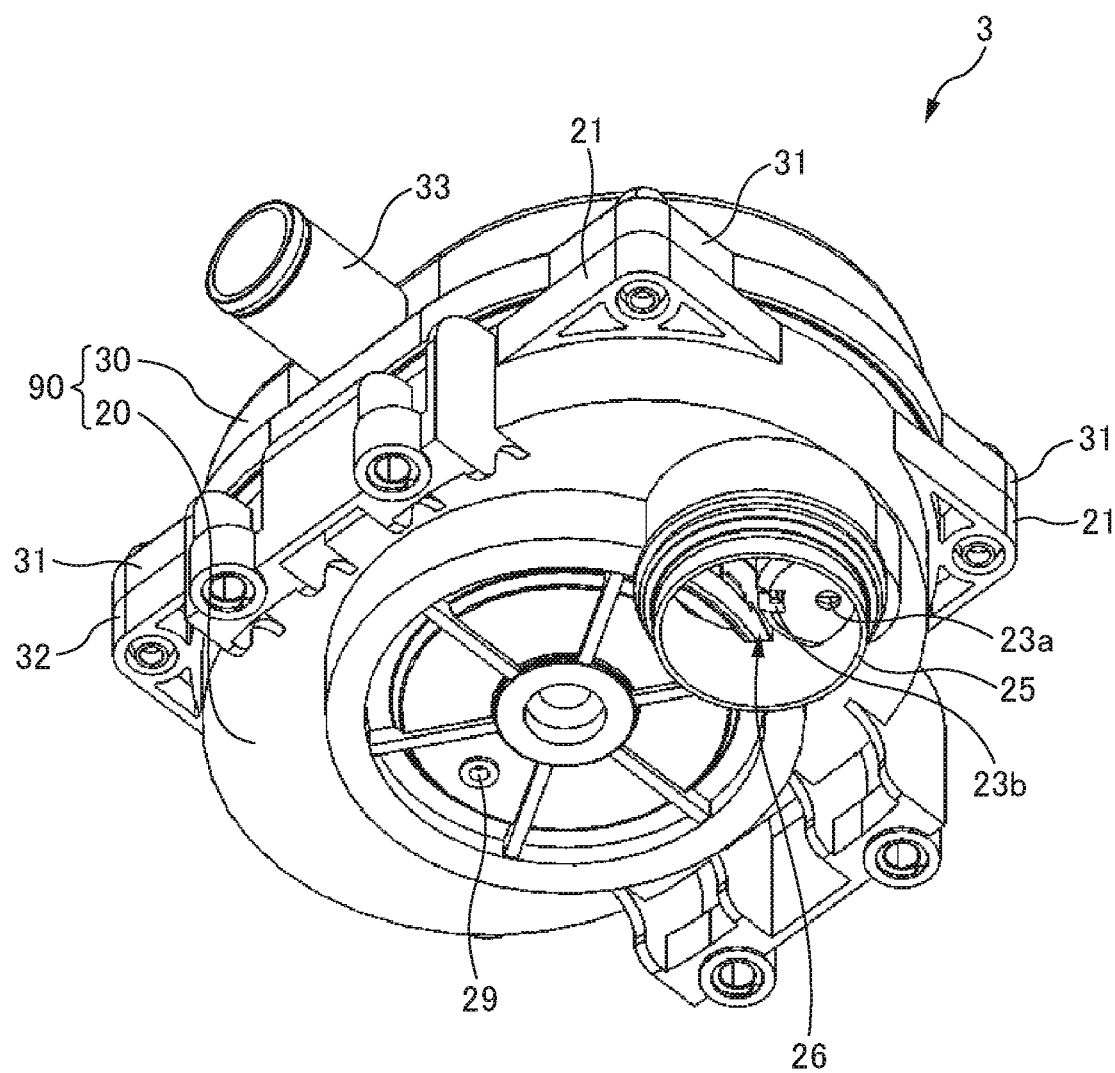
FIG. 7 is a perspective view illustrating the oil separator viewed from a front side, a lower side, and a right side.
Figure 9:
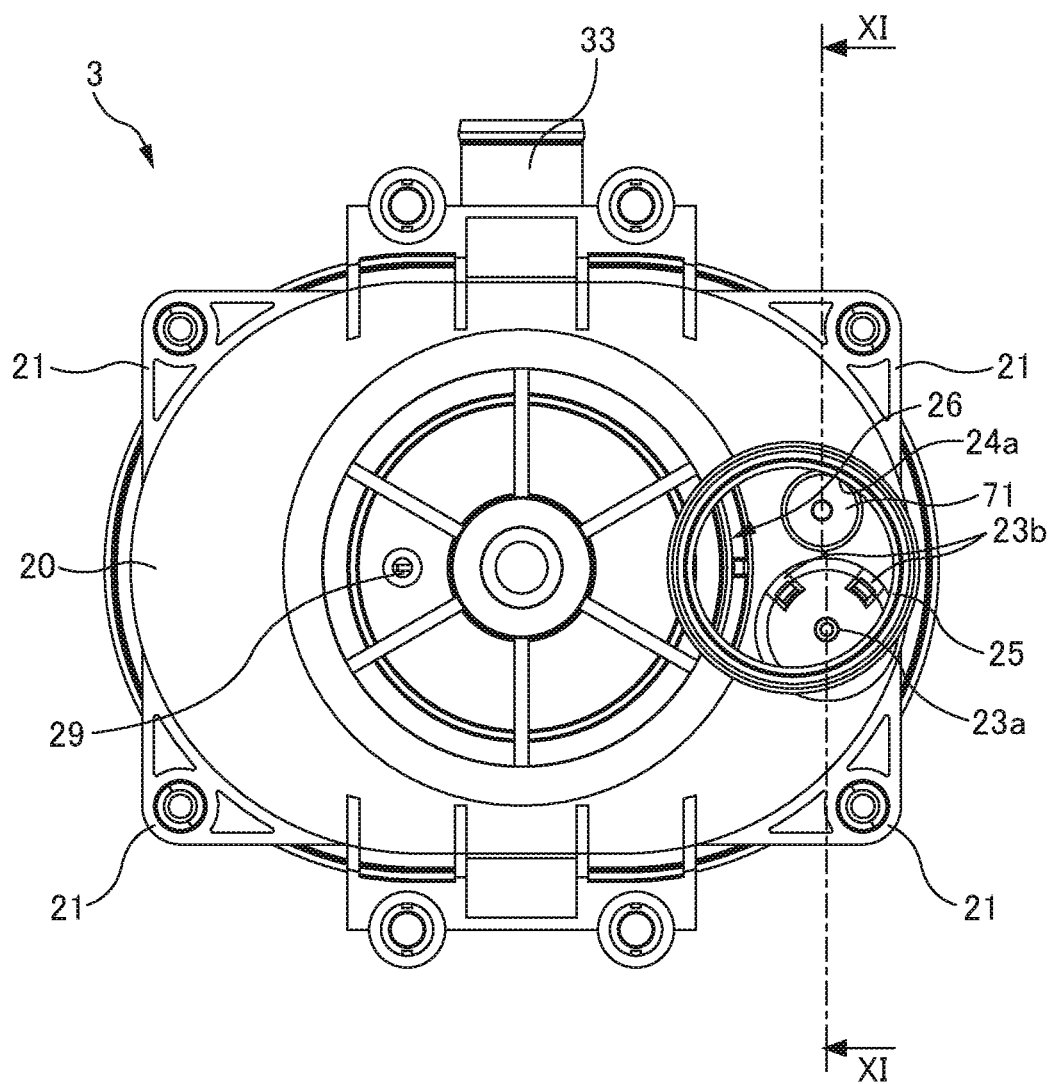
FIG. 9 is a bottom view of the oil separator.

As illustrated in FIGS. 6, 7 and 9, an inlet hole 26 is formed in a part of the inner peripheral surface of the first housing depressed portion 22, the part being close to the second housing depressed portion 23 and the valve seat 24. The inlet hole 26 extends through from the inner peripheral surface of the first housing depressed portion 22 to a part of the outer surface of the case 20, the part being inside the coupling pipe portion 25. This inlet hole 26 is an inlet to take the blow-by gas containing the oil mist into the housing 90.

Figure 12:
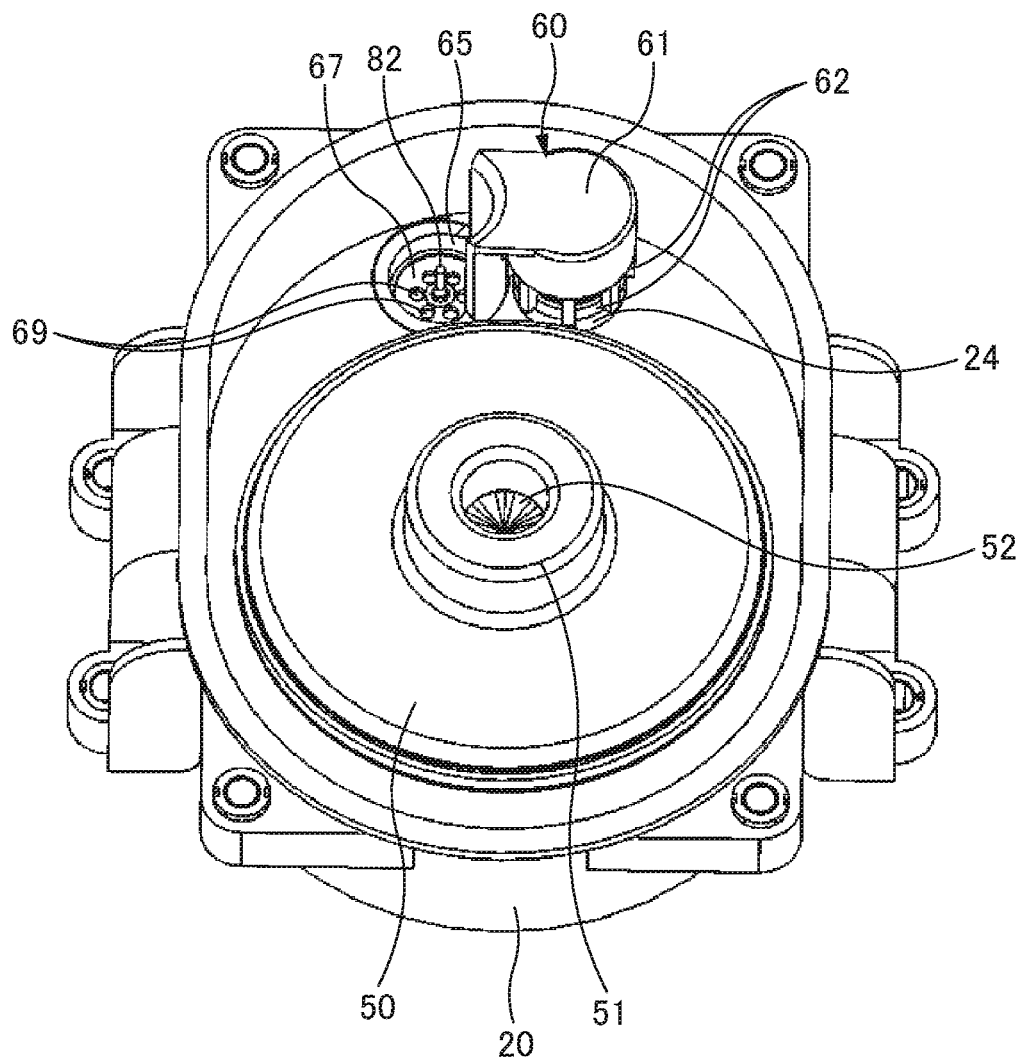
FIG. 12 is a perspective view illustrating a lower case of the oil separator viewed from an upper side and a left side.

As illustrated in FIGS. 6, 10 and 12, the PCV cover 50 covers the first housing depressed portion 22. The peripheral edge portion of the PCV cover 50 is mounted in an airtight manner to the bottom surface of the case 20 nearby the first housing depressed portion 22. A protruding portion 51 is formed at the center on the top surface of this PCV cover 50. A communication hole 52 penetrates from the top surface of the protruding portion 51 to the lower surface of the PCV cover 50. The protruding portion 51 on the PCV cover 50 is fitted to the gas introduction hole 13c. The communication hole 52 is communicated with the internal space of the filter body 11. The communication hole 52 is to cause the blow-by gas to flow from inside the first housing depressed portion 22 into the internal space of the filter body 11. FIG. 12 illustrates the case 20 from which the cover 30 and the oil mist filter 10 are removed for easy view of the inside of the case 20.

The PCV cover 50 supports the second end plate 13 from below. Therefore, the second end plate 13 is located away from the bottom surface of the first housing depressed portion 22.

The PCV valve 40 is mounted below the PCV cover 50 and inside the first housing depressed portion 22. The PCV valve 40 adjusts the flow rate of the blow-by gas to appropriately adjust the intake air pressure of the engine 4 and a pressure on the crankcase side. Specifically, the PCV valve 40 adjusts the level of opening of the communication hole 52 on the PCV cover 50 to adjust the flow rate of the blow-by gas.

The PCV valve 40 includes a diaphragm 41, an upper spring 42, and a lower spring 43.

The diaphragm 41 is a disk-shaped valve element manufactured by molding rubber and resin. This diaphragm 41 is mounted to the bottom surface of the first housing depressed portion 22. Specifically, a ring-shaped pedestal portion 28 is disposed at the bottom surface inside the first housing depressed portion 22 so as to form a projecting shape. The peripheral edge portion of the diaphragm 41 is mounted to the pedestal portion 28. Accordingly, the diaphragm 41 partitions a space inside the first housing depressed portion 22 into the lower space and the upper space.

As illustrated in FIGS. 6, 7, 9 and 10, a pressure control hole 29 is formed on the bottom surface of the first housing depressed portion 22. The pressure control hole 29 is arranged inside with respect to the pedestal portion 28 and arranged outside the coupling pipe portion 25. Accordingly, the pressure control hole 29 causes the pressure of the space below the diaphragm 41 to be atmospheric pressure. Meanwhile, the inlet hole 26 is disposed outside with respect to the pedestal portion 28. The space above the diaphragm 41 is communicated with the inside of the coupling pipe portion 25 through the inlet hole 26.

As illustrated in FIG. 10, the upper spring 42 and the lower spring 43 are elastic members to support the center of the diaphragm 41 in a vertically movable manner. The upper spring 42 is interposed between the diaphragm 41 and the PCV cover 50 above the center of the diaphragm 41. The lower spring 43 is interposed between the diaphragm 41 and the bottom surface of the first housing depressed portion 22 below the center of the diaphragm 41. The diaphragm 41 is interposed between these upper spring 42 and lower spring 43 such that the diaphragm 41 is movably supported by the upper spring 42 and the lower spring 43.

As illustrated in FIGS. 6, 11, and 12, the valve case member 60 is mounted inside the case 20. The valve case member 60 includes a valve box portion 61, a valve guiding portion 65, and a valve seat 67. By molding these valve box portion 61, valve guiding portion 65 and valve seat 67 as a single integrated unit, the valve case member 60 is formed.

The valve box portion 61 has a tubular shape whose upper end is closed and lower end is open. Cutout-shaped gas escaping portions 62 are formed at the lower end of the valve box portion 61, and extend through from the inner peripheral surface to the outer peripheral surface of the valve box portion 61. The lower opening of the valve box portion 61 is opposed to an opening 24a, which is formed on the top end surface of the valve seat 24. The lower end surface of the valve box portion 61 abuts on the valve seat 24, and the valve box portion 61 is fixed to the case 20. The opening 24a on the valve seat 24 extends through to a part of the lower surface of the case 20, the part being located inside the coupling pipe portion 25.

The relief valve 70 is mounted inside the valve box portion 61. When the pressure inside the coupling pipe portion 25 is less than a predetermined threshold, this relief valve 70 closes the opening 24a. When the pressure inside the coupling pipe portion 25 is equal to or more than the predetermined threshold, the relief valve 70 opens the opening 24a. The relief valve 70 includes a valve element 71 and a biasing spring 72. The valve box portion 61 internally houses the valve element 71. The valve element 71 is vertically guided by the inner peripheral surface of the valve box portion 61. The biasing spring 72 is interposed between the valve element 71 and the ceiling of the valve box portion 61. The biasing spring 72 is vertically compressed and an elastic force from the biasing spring 72 presses the valve element 71 to the valve seat 24, thus closing the opening 24a by the valve element 71.

A part of the upper end of the valve guiding portion 65 is coupled to a part of the lower end of the valve box portion 61. The valve guiding portion 65 has a tubular shape. The axis of the valve guiding portion 65 is displaced from the axis of the valve box portion 61. The valve guiding portion 65 internally includes the valve seat 67, and the valve seat 67 vertically partitions the internal space of the valve guiding portion 65. The valve guiding portion 65 is fitted to the second housing depressed portion 23. The valve guiding portion 65 does not project upward with respect to the inside bottom surface of the case 20. The top end surface of the valve guiding portion 65 aligns with the inside bottom surface of the case 20 or is positioned lower than the bottom surface.

A cutout-shaped oil escaping portion 66 is formed at the lower end of the valve guiding portion 65 and extends through from the inner peripheral surface to the outer peripheral surface of the valve guiding portion 65. Meanwhile, an oil discharge port 23b is formed at the inner peripheral surface of the second housing depressed portion 23. The oil discharge port 23b is communicated from the inner peripheral surface of the second housing depressed portion 23 to a part of the outer surface of the case 20, the part being inside the coupling pipe portion 25. The oil discharge port 23b is placed on the oil escaping portion 66.

A rod through hole 68 is formed at the center of the valve seat 67 so as to vertically penetrate the valve seat 67. A plurality of drain holes 69 are formed at the peripheral area of the rod through hole 68. These drain holes 69 vertically extends through the valve seat 67. Meanwhile, an oil discharge port 23a is formed at the center on the bottom surface of the second housing depressed portion 23.

The anti-drain valve 80 is disposed in a region lower than the valve seat 67 in the internal space of the valve guiding portion 65. This anti-drain valve 80 closes the drain holes 69 due to the pressure in the coupling pipe portion 25 while the engine 4 operates, and opens the drain holes 69 while the engine 4 stops.

The anti-drain valve 80 includes: a valve element 81, which is a rubber elastic body; a valve rod 82; and a valve rod 83. The valve element 81 has a disk shape. The valve rod 82 is disposed stood at the center of the top surface of the valve element 81. The valve rod 83 is disposed stood at the center of the lower surface of the valve element 81. The valve element 81 is housed in a region lower than the valve seat 67 in the internal space of the valve guiding portion 65. The valve rod 82 is fitted to the rod through hole 68 to be mounted to the valve seat 67. This causes the valve element 81 to abut on the lower surface of the valve seat 67, thus the valve element 81 closes the plurality of drain holes 69. Meanwhile, bending elastic deformation of the valve element 81 separates the valve element 81 from the lower surface of the valve seat 67 and opens the plurality of drain holes 69.

As described above, attaching the PCV cover 50 to the housing 90 forms a gas-introduction flow passage communicated from outside the housing 90 to the hollow of the filter body 11. This gas-introduction flow passage is a flow passage from the internal space of the coupling pipe portion 25 to the communication hole 52 via the inlet hole 26 and the first housing depressed portion 22 (especially, a space between the PCV cover 50 and the diaphragm 41). The PCV valve 40 is disposed in the gas-introduction flow passage.

Attaching the valve box portion 61 of the valve case member 60 to the housing 90 forms a bypass flow passage, which is branched from the gas-introduction flow passage and is communicated to a lower region of the collar portion 12c (especially, the outside of the outer peripheral surface of the filter body 11). The bypass flow passage is a flow passage from the opening 24a of the valve seat 24 to the gas escaping portion 62 via the internal space of the valve box portion 61. The relief valve 70 is disposed in the bypass flow passage.

Attaching the valve guiding portion 65 and the valve seat 67 of the valve case member 60 to the housing 90 forms an oil drain flow passage, which is branched from the gas-introduction flow passage and is communicated to the lower region of the collar portion 12c (especially, the outside of the outer peripheral surface of the filter body 11). The oil drain flow passage is a flow passage from the oil discharge port 23b to the drain holes 69 via the oil escaping portion 66 and the second housing depressed portion 23. The anti-drain valve 80 is disposed in the oil drain flow passage.

Subsequently, the following describes operations of the oil separator 3.

While the engine 4 stops, the blow-by gas is not supplied from the engine 4 to the oil separator 3; therefore, the pressure inside the coupling pipe portion 25 becomes low, almost at atmospheric pressure.

The actuation of the engine 4 supplies the blow-by gas containing the oil mist from the engine 4 to inside the coupling pipe portion 25, thus increasing the pressure inside the coupling pipe portion 25. The valve element 81 is pressed by the pressure and abuts on the lower surface of the valve seat 67. Even if the pressure inside the coupling pipe portion 25 increases, as long as the pressure is less than the predetermined threshold, the valve element 71 of the relief valve 70 closes the opening 24a.

The blow-by gas supplied to the coupling pipe portion 25 passes through the inlet hole 26 and is introduced into the first housing depressed portion 22 (especially, the region on the upper side of the diaphragm 41). The blow-by gas passes from the first housing depressed portion 22 through the communication hole 52 on the PCV cover 50, and flows into the filter body 11. The blow-by gas passes from the inner peripheral surface to the outer peripheral surface of the filter body 11. The filter body 11 captures the oil mist contained in the blow-by gas.

The blow-by gas blown out from the outer peripheral surface of the filter body 11 passes through the ventholes 12d, and flows onto the first end plate 12. The blow-by gas that has passed through the ventholes 12d passes from inside the cover 30 through the gas discharge portion 33 and is discharged to the breather pipe 2. This recirculates the blow-by gas to the engine 4.

Due to the flow of the blow-by gas blow out from the filter body 11, a part of the oil captured by the filter body 11 is blown out from the outer peripheral surface of the filter body 11. Such oil is in a form of droplet with a large grain diameter. Accordingly, the first end plate 12 blocks the oil blown out from the outer peripheral surface of the filter body 11; therefore, the oil does not pass through the ventholes 12d.

When the blow-by gas passes through the communication hole 52, the flow rate of the blow-by gas is adjusted. That is, in a case of an excessively large intake air pressure (a negative pressure) of the engine 4, the center of the diaphragm 41 moves upward, and the level of opening of the lower opening of the communication hole 52 decreases; thus, the flow rate of the blow-by gas is reduced. Meanwhile, in a case of a high pressure on the crankcase side, the center of the diaphragm 41 moves downward, and the level of opening of the lower opening of the communication hole 52 increases; thus, the flow rate of the blow-by gas increases. Thus, the flow rate of the blow-by gas is appropriately adjusted by the diaphragm 41. The engine 4, especially the pressure of the crankcase is also appropriately adjusted.

Since the continuous operation of the engine 4 causes the drain holes 69 to be closed by the valve element 81, the oil captured by the filter body 11 is accumulated at the lower portion inside the case 20. When the amount of the oil in the case 20 increases and the liquid surface of the oil reaches above the lower end surface of the filter body 11, the lower portion of the filter body 11 is immersed in the oil. Accordingly, the blow-by gas blown out from the outer peripheral surface of the filter body 11 floats up as the air bubbles in the oil. Droplets of the oil jump up from the liquid surface of the oil due to an influence of the air bubbles. The collar portion 12c of the first end plate 12 blocks such droplets of the oil, and the droplets do not pass through the ventholes 12d.

The excessive supply of the blow-by gas to the coupling pipe portion 25 during operations of the engine 4 causes the pressure inside the coupling pipe portion 25 to be equal to or more than the predetermined threshold. Accordingly, the valve element 71 of the relief valve 70 moves upward away from the valve seat 24 against the elastic force from the biasing spring 72, and the opening 24a becomes open. Therefore, the blow-by gas inside the coupling pipe portion 25 passes through the opening 24a, the gas escaping portion 62, and the ventholes 12d, and then flows onto the first end plate 12. Then, the gas passes through the gas discharge portion 33 and is discharged to the breather pipe 2.

When the pressure inside the coupling pipe portion 25 is less than the predetermined threshold, the valve element 71 of the relief valve 70 is pressed against the valve seat 24 by the elastic force from the biasing spring 72; thus, the valve element 71 closes the opening 24a. This stops the flow of the blow-by gas passing through the bypass flow passage (the opening 24a, the gas escaping portion 62, and the ventholes 12d).

When the engine 4 stops, the supply of the blow-by gas from the engine 4 to inside the coupling pipe portion 25 stops, and the pressure inside the coupling pipe portion 25 decreases. Then, due to the weight of the oil accumulated at the lower portion inside the case 20, the valve element 81 bends downward. Thus, the valve element 81 moves downward away from the lower surface of the valve seat 67, and the plurality of drain holes 69 open. Therefore, the oil accumulated at the bottom of the case 20 flows into the engine 4 through the drain holes 69, the oil escaping portion 66, the oil discharge port 23a, the oil discharge port 23b, and the coupling pipe portion 25. Accordingly, the separated oil recovers to the engine 4. When the oil discharge is terminated, the valve element 81 abuts on the lower surface of the valve seat 67 due to the elastic force; thus, the drain holes 69 by the valve element 81 are closed.

Subsequently, the following describes a maintenance method for the oil separator 3.

First, prepared is a new oil mist filter 10 (hereinafter referred to as a new oil mist filter 10), which is different from the oil mist filter 10 installed inside the housing 90 of the oil separator 3 (hereinafter referred to as the old oil mist filter 10).

Next, the tightened bolts 39 are loosened to remove the cover 30 from the case 20.

Next, the old oil mist filter 10 is removed from the case 20.

Next, the second end plate 13 of the new oil mist filter 10 is oriented downward to house the second end plate 13 and the filter body 11 to the inside of the case 20. In this respect, the position of the gas introduction hole 13c of the second end plate 13 of the new oil mist filter 10 is matched with the position of the protruding portion 51 of the PCV cover 50. Then, the protruding portion 51 is fitted to the gas introduction hole 13c. The peripheral edge portion of the collar portion 12c of the first end plate 12 and the gasket 15 are stacked on the top end surface of the case 20 (the edge part on the upper opening of the case 20).

Next, the lower opening of the cover 30 is oriented downward to cover the cover 30 over the case 20. In this respect, the top end surface of the case 20 (the edge part on the upper opening of the case 20) and the gasket 15 are matched to the stepped depressed portion 32. Then, the upper end of the case 20 and the gasket 15 are fitted to the stepped depressed portion 32.

Next, the extended edges 21 of the case 20 and the extended edges 31 of the cover 30 are tightened with the bolts 39 to fix the case 20 and the cover 30.

The above-described embodiments bring the following advantages and effects.

(1) Since the collar portion 12c of the first end plate 12 catches the spray of oil, the blow-by gas discharged from the gas discharge portion 33 hardly contains the oil. Accordingly, a catching effect of oil brought by this oil separator 3 is high.

(2) The inclination of the collar portion 12c of the first end plate 12 (especially, the region on which the plurality of ventholes 12d are formed) forms the space 38 above the collar portion 12c. This makes it possible for the center part of the first end plate 12 to be positioned near the top panel of the cover 30. This can reduce the height of the cover 30, thereby ensuring configuring the oil separator 3 compact.

(3) The valve seat 24, the first housing depressed portion 22, and the second housing depressed portion 23 are arranged close to one another, and therefore the introduction part for blow-by gas (the inlet hole 26), the escaping part for blow-by gas (the opening 24a), and the discharge part for oil (the oil discharge port 23b) are gathered at the coupling pipe portion 25. This simplifies the coupling or the tubing between the engine 4 and the oil separator 3, ensuring making the structure of the engine 4 and the oil separator 3 simple.

(4) Since the valve seat 24 and the second housing depressed portion 23 are arranged close to one another, a holder to hold the relief valve 70 and the anti-oil valve 80 can be a single common component as the valve case member 60. That is, the valve box portion 61, the valve guiding portion 65, and the valve seat 67 are molded as a single integrated unit. This ensures a reduction in the number of components for the oil separator 3 and an improvement in work efficiency to assemble the oil separator 3.

(5) For example, even if the filter body 11 is clogged, the relief valve 70 bypasses the blow-by gas supplied to the coupling pipe portion 25 to downstream of the filter body 11. Accordingly, a failure such as the stop of the flow of the blow-by gas can be prevented.

(6) During operations of the engine 4, the oil does not flow into the communicating pipe portion 25 because the anti-drain valve 80 closes the drain holes 69. This allows preventing the blow-by gas flowing inside the filter body 11 passing through the communicating pipe portion 25 or a similar component from contacting the oil inside the communicating pipe portion 25. Accordingly, the separation efficiency of oil brought by this oil separator 3 is high.

The description of the above-described embodiments is for ease of understanding of the present invention and does not limit the present invention. The present invention may be modified or improved without departing from the gist and includes the equivalents.

Figure 13:
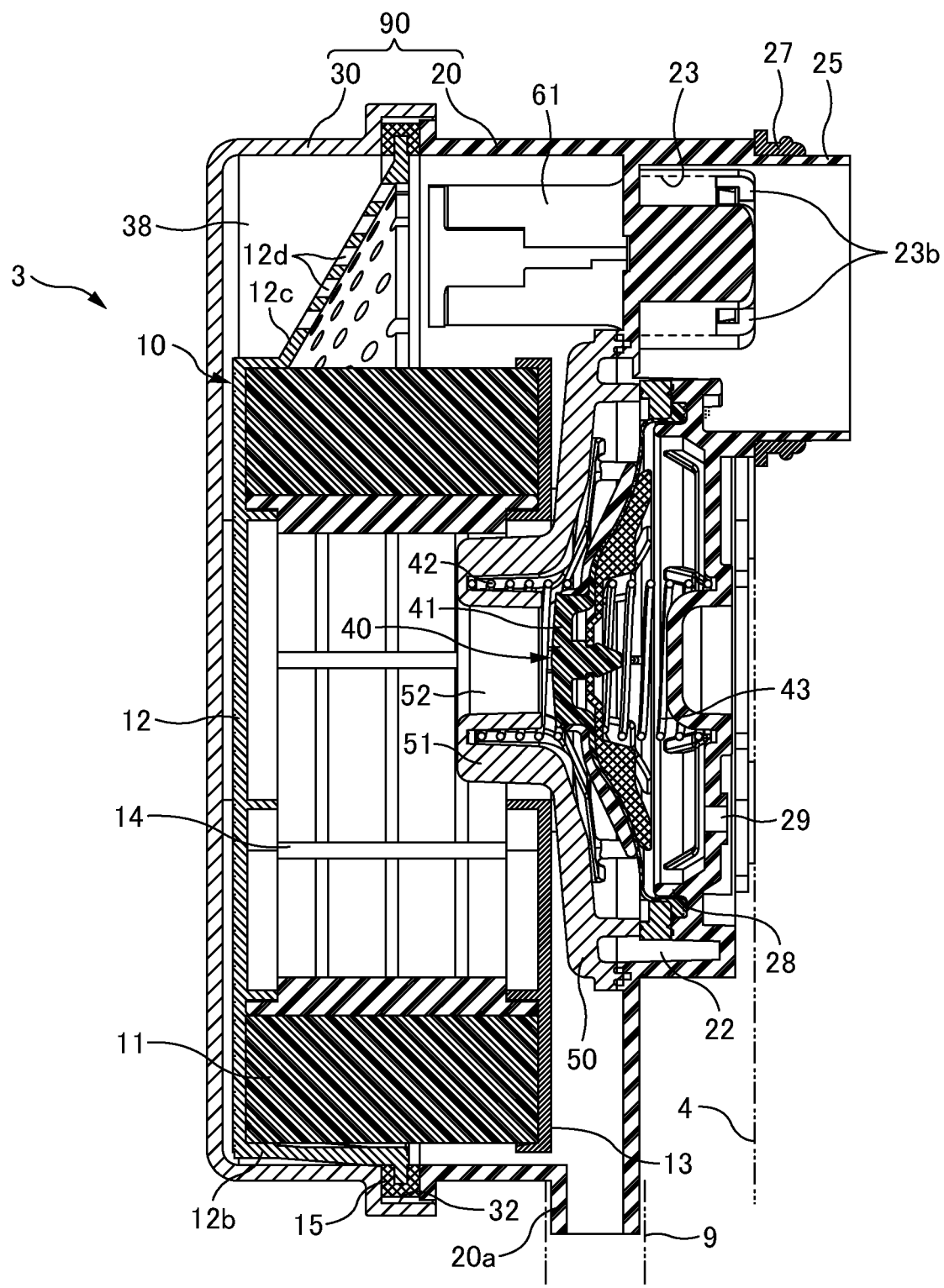
FIG. 13 is a vertical cross-sectional view of an oil separator according to a modification.

The above-described embodiments explain the transversely-placed oil separator 3. On the other hand, as illustrated in FIG. 13, the oil separator 3 may be vertically mounted to the side surface. Specifically, the lower surface of the case 20 is oriented to the side surface of the engine 4, and the coupling pipe portion 25 is coupled to the side surface of the engine 4. In this case, the side surface of the case 20 is oriented vertically downward. An oil discharge portion 20a projects at the side surface. The oil discharge portion 20a has a tubular shape, and the internal space of the oil discharge portion 20a is communicated with the inside of the case 20. Further, the oil discharge portion 20a is coupled to one end of a pipe 9, and the other end of the pipe 9 is coupled to the engine 4. Therefore, the oil captured by the filter body 11 of the oil separator 3 passes through the case 20 through the oil discharge portion 20a through the pipe 9, and flows into the engine 4.

The above-described embodiments describe the blow-by gas as the processing-target gas as the example. In contrast to this, as long as the gas contains the mist oil to be the target for separation, the gas can be the processing-target gas.

REFERENCE SIGNS LIST 1 system, 2 breather pipe, 3 oil separator, 4 engine
5 intake-side flow passage, 6 air filter, 7 turbocharger
8 charge cooler, 9 pipe, 10 oil mist filter, 11 filter body
12 first end plate, 12a rib, 12b stepped portion
12c collar portion, 12d venthole, 13 second end plate
13a outer peripheral rib, 13b inner peripheral rib
13c introduction hole, 14 frame, 15 gasket, 20 case
20a discharge portion, 21 extended edge,
22 first housing depressed portion (component of gas-introduction flow passage)
23 second housing depressed portion (component of oil drain flow passage)
23a oil discharge port
23b oil discharge port (component of oil drain flow passage)
24 valve seat
24a opening (component of bypass flow passage)
25 coupling pipe portion (component of gas-introduction flow passage)
26 inlet hole (component of gas-introduction flow passage)
27 seal, 28 pedestal portion, 29 pressure control hole
30 cover, 31 extended edge, 32 stepped depressed portion
33 gas discharge portion, 38 space, 39 bolt, 40 PCV valve
41 diaphragm, 42 upper spring, 43 lower spring, 50 PCV cover
51 protruding portion
52 communication hole (component of gas-introduction flow passage)
60 valve case member
61 valve box portion (component of bypass flow passage)
62 gas escaping portion (component of bypass flow passage)
65 valve guiding portion
66 oil escaping portion (component of oil drain flow passage)
67 valve seat, 68 rod through hole
69 drain hole (component of oil drain flow passage)
70 relief valve, 71 valve element, 72 biasing spring
80 anti-drain valve, 81 valve element, 82 valve rod
83 valve rod, 90 housing

The invention claimed is:

1. An oil mist filter comprising:
a filter body having a tubular shape,
the filter body causing processing-target gas supplied to a hollow in the filter body to pass through an outer peripheral surface to capture oil mist contained in the processing-target gas; and
an end plate disposed at one end surface of the filter body,
the end plate projecting outward beyond an outer peripheral edge of the one end surface of the filter body, wherein a plurality of ventholes are formed at a portion of the end plate projecting beyond the outer peripheral edge of the one end surface of the filter body, and the processing-target gas blown out from the outer peripheral surface of the filter body passes through the ventholes, and the portion of the end plate projecting beyond the outer peripheral edge of the one end surface of the filter body inclines to another end surface of the filter body.

2. The oil mist filter according to claim 1, wherein the oil mist filter further comprises a gasket disposed at a peripheral edge portion of the end plate.

3. The oil mist filter according to claim 1, wherein the oil mist filter further comprises a second end plate disposed at the other end surface of the filter body, and the second end plate has a gas introduction hole, the gas introduction hole being communicated with the hollow in the filter body.

4. The oil mist filter according to claim 1, wherein the oil mist filter further comprises a grid-like frame disposed along an inner peripheral surface of the filter body.

5. An oil separator comprising:
the oil mist filter according to claim 1; and
a housing that houses the oil mist filter, wherein the housing includes:
   a box-shaped case having an opening; and
   a box-shaped cover having an opening,
an internal space of the housing is formed
   by facing the opening of the case and the opening of the cover and
   by butting together an edge portion on the opening of the case and an edge portion on the opening of the cover while a peripheral edge portion of the end plate is interposed between the case and the cover,
the internal space of the housing is partitioned by the end plate into two regions, and
the filter body is housed in one region of the two regions.

6. The oil separator according to claim 5, wherein the oil separator further comprises:

a gas-introduction flow passage disposed in the housing,
   the gas-introduction flow passage introducing the processing-target gas containing the oil mist from outside the housing to the hollow in the filter body;

a bypass flow passage disposed in the housing,
   the bypass flow passage being branched from the gas-introduction flow passage and extending in the one region to outside the outer peripheral surface of the filter body;

a relief valve disposed at the bypass flow passage,
   the relief valve being to close the bypass flow passage when a pressure of the processing-target gas introduced to the gas-introduction flow passage is less than a predetermined threshold,
   the relief valve being to open the bypass flow passage when the pressure of the processing-target gas introduced to the gas-introduction flow passage is equal to or more than the predetermined threshold; and a gas discharge portion disposed in the other region of the two regions in the housing,
   the gas discharge portion discharging the processing-target gas from the other region.

7. The oil separator according to claim 6, wherein the oil separator further comprises:

an oil drain flow passage disposed in the housing,
   the oil drain flow passage being branched from the gas-introduction flow passage and extending to the one region; and an anti-drain valve disposed at the oil drain flow passage,
   the anti-drain valve being to close the oil drain flow passage by the pressure of the processing-target gas introduced to the gas-introduction flow passage,
   the anti-drain valve being to open the oil drain flow passage when the processing-target gas is not introduced to the gas-introduction flow passage.

* * * * *